April 4, 1944.   R. E. LEARY   2,345,939
FLOCK-COATED DIE
Filed March 6, 1942
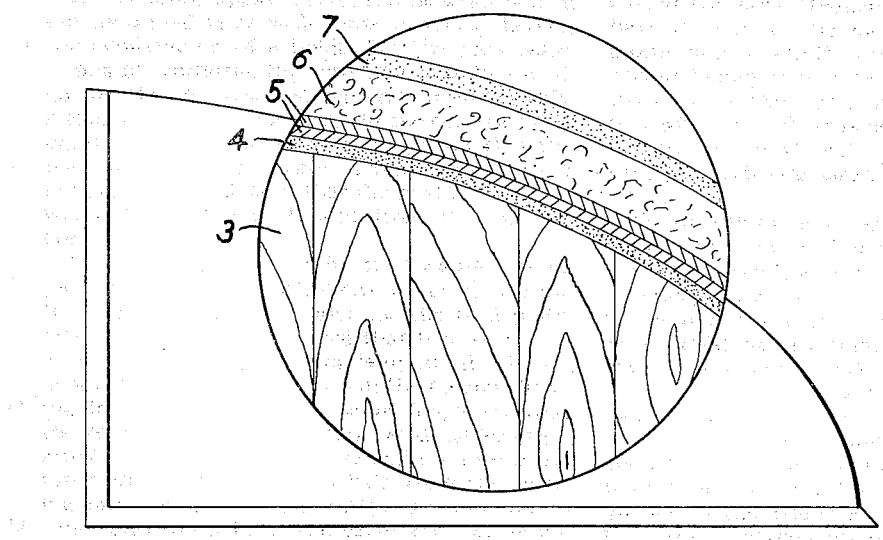
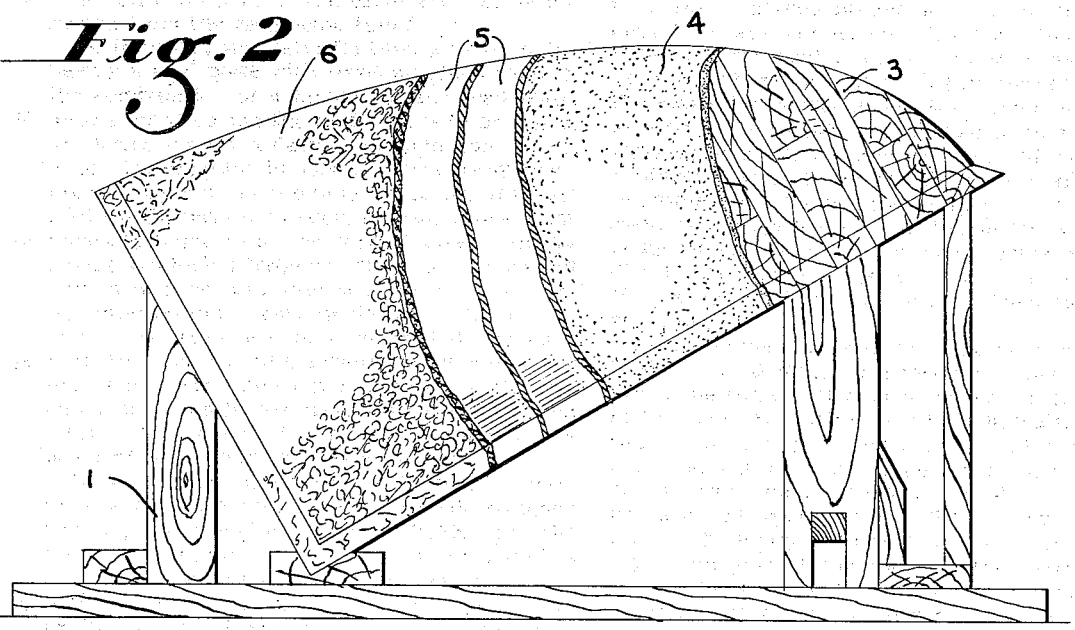
Fig. 2
Fig. 1
Richard E. Leary   INVENTOR
BY   J. M. Castle Jr.
ATTORNEY Patented Apr. 4, 1944

2,345,939

UNITED STATES PATENT OFFICE 2,345,939

FLOCK-COATED DIE

Richard E. Leary, Newark, N. J., assignor to E. I. du Pont de Nemours & Company, Wilmington, Del., a corporation of Delaware Application March 6, 1942, Serial No. 433,617

3 Claims. (Cl. 18—35)

This invention relates to flock-coated dies and, more particularly, to such dies adapted for use in forming thermoplastic sheet material into articles having three-dimensional curved surfaces.

The shaping of thermoplastic sheets is usually accomplished by draping or stretching the softened sheet over a form, or by pressing it between male and female dies. Alternatively, the sheet may be forced into a negative die by the application of fluid pressure or by the withdrawal of air from the die. Softening of the plastic material is customarily effected by heating.

When transparent organic sheet material is used as a substitute for glass in such places as gun turrets, cock pit enclosures and nose pieces for airplanes, it is required that the material be free from distortion, that the surfaces be highly polished and smooth, and that the structures be free from dangerous strains. To prevent the development of strains care must be taken that the thermoplastic sheet is hot enough to permit it to conform easily to the contours of the die. However, because the forming die and the sheet come into very intimate contact in the shaping operation, the surface of the sheet, if soft enough to be molded properly, will assume any textural irregularities in the surface of the die; further it is difficult and expensive to give the articles, after shaping, the necessary high polish so that it is expedient to produce the surface finish before shaping and to use such care in molding as will prevent formation of surface defects.

To this end, it has been considered necessary to use a die having a hard, highly polished and, consequently, very expensive surface, as otherwise the sheet may be roughened and marred. It has also been suggested to cover a die having an inferior surface with a sheet of billiard felt, outing flannel or suede rubber.

Where the degree of deformation is great and the optical requirements high, the prior art has had difficulty in producing an acceptable thermoplastic article. Sheet covering materials of poor elasticity cannot be made to conform sufficiently closely to the configurations of many dies, particularly where the surfaces of the dies are curved in a plurality of directions. Suede rubber sheeting not only is insufficiently elastic but also when stretched presents an imperfect surface due to the separation of the flock particles. Moreover, sheet covering material which corresponds more or less exactly to the die surface when applied, may wrinkle during the forming operation, causing irregularities in the finished article. Even expensive, highly polished dies may fail to produce deeply drawn curved articles retaining the smoothness and high polish of the original sheeting.

An object of the present invention is to furnish an apparatus for shaping thermoplastic sheet material. More particularly, it is an object to provide apparatus for forming three-dimensional curved objects of high optical quality from thermoplastic sheets. A further object is to provide a die whereby deeply drawn articles free from distortion and surface defects may be formed from thermoplastic sheet material. Other objects will be apparent from the description of the invention given hereinafter.

The above objects are accomplished according to the present invention by softening a sheet of thermoplastic material and forming it into an article having curved surfaces by pressing it between mating dies, one or both of which has its forming surfaces coated with flock and, preferably, also with grease, or by forcing it by fluid pressure into a single flock-coated negative die, or by draping it upon a flock-coated positive die or form.

It has been found that the forming surfaces of a die may be rendered suitable for shaping easily marred thermoplastic material by coating first with an adhesive cement and, subsequently, while the cement is still wet, with flock, in such a manner as to produce a uniform suede-like finish. In addition, it has been discovered that articles having a high degree of deformation may be formed from thermoplastic sheet material without distortion or irregularities and substantially free from surface blemishes by the use of a coating of a cushioning or lubricating substance on a flock-coated die.

The invention will be more fully described with reference to the accompanying drawing wherein:

Fig. 1 is a side elevation of a positive die constructed according to one embodiment of the present invention; and Fig. 2 is an enlarged, fragmentary vertical section along the longitudinal axis of the die shown in Fig. 1; as shown in Fig. 2, the die is provided with a layer of grease according to a preferred embodiment of the present invention.

Like reference numerals refer to like parts throughout the drawing.

Referring more particularly to Fig. 1, a die adapted for forming nose pieces for airplanes from thermoplastic sheets, is shown supported by a frame 1. The structure of the surface of the die is illustrated as partly broken away to expose successive coatings. The basic material 3 of the die is provided with a primer 4, two coats of cement 5, and a coat of flock 6. Prior to the drawing operation, grease 7 (see Fig. 2) is preferably distributed over the flock-coated surface.

The die may be constructed of various materials, wood being particularly satisfactory. The bare surface of the die is smoothed and cleaned; it is then coated, conveniently by spraying, first with a primer if the character of the surface makes this necessary, and subsequently with an adhesive cement. Depending upon the nature of the surface of the die and of the coating materials, it may be desirable to use more than one coat of primer or cement or both. Care must be taken to distribute the coating substance or substances uniformly so that the resulting surface is smooth.

Before the final coat of cement has set, flock such as comminuted cotton, wool, or silk, is distributed evenly over the tacky surface and forced into intimate contact with it by means of blasts or jets of air. The cement is then dried or otherwise cured.

The cement may be any one of a large group of cements which have the proper working characteristics and which will neither react with the other substances with which it may come into contact, nor soften objectionably at the forming temperature to be employed. It is preferred to use as the cement a composition comprising a resilient material such as rubber, chlorinated rubber or neoprene. The advantage of such cements is that they give coatings which yield and give a slightly lateral motion which seems almost essential in deep-draw forming.

As the flock material, cotton fibers comminuted to an average length of about one-half millimeter are eminently suitable although fibers of a smaller or larger length may be used. Any fibrous flock which yields a soft suede-like or felt-like surface, is suitable for use in the present invention. Obviously, the application of the flock need not necessarily be by blowing with air but may be accomplished by any process known to the art. Under some conditions a primary coating of flock followed by an additional coat of cement and a second layer of flock may give a superior coating.

Dies coated in this manner may be used singly or in complementary pairs without lubricants in many forming operations, particularly where the degree of deformation is not great, for producing curved structures of good optical quality from thermoplastic sheet material. The coating necessarily conforms exactly to the contour of the die and does not wrinkle or bulge in use. When made with due care, the surface finish is uniformly smooth and of even texture.

The shaping of three-dimensional curved articles of a high degree of deformation is usually accomplished by positioning a thermoplastic sheet warmed to the softening point across the opening of a negative mold, and pressing it against a positive mold. In such cases, even the use of dies coated with flock as hereinbefore described may not be sufficient to obviate entirely distortion of the plastic material and marring of the surface during molding.

It has been discovered, however, that if the positive, flock-coated die is covered with a cushioning or lubricating substance, deep draws may be made while substantially retaining the smoothness and high polish of the original sheeting, and, at the same time, forming a structure regular in contour and free from distortion. The product sold commercially as "Extra Heavy Gear Lube," which is a petroleum oil bodied with a calcium soap and having an A. S. T. M. consistency of about 265, unworked, (A. S. T. M. test D217, 33T is preferred as a lubricating substance although numerous other suitable lubricants will occur to those skilled in the art such as blown castor oil, triethanolamine oleate, and various bodied hydrocarbon greases. It is, of course, essential that the lubricant be inert to the sheet material which is subjected to the forming operation.

Because most of the surface marring is caused by the positive die pressing and sliding against the inner side of the sheet, it is usually unnecessary to lubricate the negative die. Nevertheless, it is within the scope of this invention to apply a lubricant to either or both of the complementary dies, either or both of which may bear a flock-coated surface.

In many applications it may be unnecessary to provide a complete negative die. For forming deeply drawn pieces of certain shapes it has been found adequate to employ a complete positive die in conjunction with a rudimentary negative die, consisting essentially of a properly supported rim or orifice. The softened thermoplastic sheet is held across the opening of the negative part and subjected to the action of the flock-coated grease-covered positive part. Flock coating is advantageously employed in the case of vacuum forming using a single negative die as disclosed in applicant's copending application Serial No. 371,889, filed December 27, 1940.

Because the lubricants which have been found most suitable, are hydrocarbons tending to have a deteriorating effect on latex and natural rubber, especially at elevated forming temperatures, it is desirable to use as the adhesive cement base for the flock a synthetic product, such as neoprene or chlorinated rubber, resistant to such action. It is feasible, however, to employ flock based on latex or natural rubber and to renew the coating on the die as soon as it has deteriorated so far as to be unsatisfactory. Further, there can be used a substance such as castor oil which, although a less efficient lubricant for the purpose, has a less destructive action on rubber.

When neoprene is used as the adhesive base for flock on a wood die, the surface of the die is first sanded and wiped clean. Two or three coats of primer are then applied by spraying, allowing at least fifteen to thirty minutes for each coat to dry before adding the subsequent coat. Two or three coats of neoprene brushing cement containing accelerator and added toluene or other solvent such as xylene or benzene, are next sprayed on, at intervals of not less than one or two hours. Dry cotton flock having an average fiber length of about one-half millimeter is blown evenly upon the final coat of adhesive while the latter is still tacky. After the neoprene base has been vulcanized for 100 hours at room temperature, followed by 48 hours at 50° C., the die is ready for use.

While the apparatus herein disclosed is particularly adapted for forming nose pieces, cockpit enclosures and gun turrets for airplanes, it will be apparent that the present invention is broadly applicable to producing three-dimensional curved structures generally. The apparatus has been found especially advantageous in the shaping of cellulose acetate sheets and sheets of polymerized methyl methacrylate but is applicable for shaping sheets of various cellulose derivatives and various polymerized substances so long as they are thermoplastic. The invention is of especial importance in forming three-dimensional articles curved in two directions transverse to each other or having a plurality of curved surfaces.

As many apparently widely different embodiments of this invention may be made without departing from the spirit and scope thereof, it is to be understood that the invention is not limited to the specific embodiments thereof except as defined in the appended claims.

I claim:

1. A die for use in forming a thermoplastic sheet into articles having highly polished and smooth, three-dimensional curved surfaces, said die comprising a rigid form providing the forming surface of the die, a coating of cement on said forming surface, and a coating of flock over said coating of cement.

2. A die for use in forming a thermoplastic sheet into articles having highly polished and smooth, three-dimensional curved surfaces, said die comprising a rigid form providing the forming surface of the die, a coating of cement on said forming surface, a coating of flock over said coating of cement, and a coating of a lubricating substance over said flock.

3. A positive die for use in forming a thermoplastic sheet into articles having highly polished and smooth, three-dimensional curved surfaces, said die comprising a rigid form providing the forming surface of the die, a coating of cement on said forming surface, said cement having a base from the group of substances consisting of neoprene and chlorinated rubber, a coating of flock consisting of cotton fibers over said coating of cement, and a coating of a hydrocarbon grease over said flock.

RICHARD E. LEARY.